(12) United States Patent
Darras et al.

(10) Patent No.: US 8,107,502 B2
(45) Date of Patent: Jan. 31, 2012

(54) METHOD AND APPARATUS FOR MONITORING PACKET NETWORKS

(75) Inventors: Samer H. Darras, Sunnyvale, CA (US); Steven R. Cole, San Jose, CA (US)

(73) Assignee: Symmetricom, Inc., San Jose, CA (US)

( * ) Notice: Subject to any disclaimer, the term of this patent is extended or adjusted under 35 U.S.C. 154(b) by 315 days.

(21) Appl. No.: 12/558,297

(22) Filed: Sep. 11, 2009

(65) Prior Publication Data

US 2011/0064091 A1 Mar. 17, 2011

(51) Int. Cl.
*H04J 3/06* (2006.01)

(52) U.S. Cl. ...................................... 370/503

(58) Field of Classification Search .............. 370/252, 370/503–510; 375/356–358; 713/400–600
See application file for complete search history.

(56) References Cited

U.S. PATENT DOCUMENTS

| | | | | |
|---|---|---|---|---|
| 5,896,388 A * | 4/1999 | Earnest | ...................... | 370/230.1 |
| 6,104,729 A * | 8/2000 | Hellum et al. | ................. | 370/503 |
| 6,236,623 B1 * | 5/2001 | Read et al. | ....................... | 368/46 |
| 6,816,510 B1 | 11/2004 | Banerjee et al. | | |
| 6,985,499 B2 * | 1/2006 | Elliot | ............................ | 370/503 |
| 7,058,020 B2 * | 6/2006 | Tavana et al. | ................. | 370/252 |
| 7,080,160 B2 * | 7/2006 | Cognet et al. | ................. | 709/248 |
| 7,747,725 B2 * | 6/2010 | Williams et al. | .............. | 709/223 |
| 7,768,931 B2 * | 8/2010 | Golparian | ..................... | 370/252 |
| 2002/0024973 A1 | 2/2002 | Tavana et al. | | |
| 2003/0235216 A1 | 12/2003 | Gustin | | |
| 2005/0207387 A1 * | 9/2005 | Middleton et al. | ............. | 370/347 |
| 2007/0268938 A1 * | 11/2007 | Dowd | .......................... | 370/509 |
| 2008/0117938 A1 | 5/2008 | Erich et al. | | |
| 2010/0189206 A1 * | 7/2010 | Kagan | ............................ | 375/354 |
| 2011/0051754 A1 * | 3/2011 | Lansdowne | ................... | 370/503 |

OTHER PUBLICATIONS

Xilinx: "Ethernet AVB Endpoint v1.1," DS677 (v1.1.1), Oct. 7, 2008.
Xilinx: "LogiCORE Tri-Mode Ethernet MAC v2.1," User Guide UG138, Apr. 28, 2005.
EP Search Report, App. No. 10176019.7, dated Nov. 15, 2010.
"Internet Protocol Data Communication Service—IP Packet Transfer and Availability Performance Parameters," ITU-T Recommendation Y.1540, Nov. 2007.
Timing and Synchronization Aspects in Packet Networks, ITU-T Recommendation G.8261/Y.1361, Apr. 2008.
IEEE Std. 1588-2008, "IEEE Standard for a Precision Clock Synchronization Protocol for Networked Measurement and Control Systems," 2008.

* cited by examiner

*Primary Examiner* — Frank Duong (74) *Attorney, Agent, or Firm* — Patterson & Sheridan, LLP (57) ABSTRACT

A packet probe for a packet network accurately generates and monitors packets within the network. The packet probe supports packet generation and packet transmission. When a packet is ready for transmission, a hardware-based time stamp unit affixes a time stamp to the packet reflecting an actual transmission time. The packet probe also supports receiving, filtering, and time stamping received packets. When a packet is received, a packet filter determines whether the received packet should be stored in memory along with a time stamp reflecting an actual reception time.

13 Claims, 5 Drawing Sheets

METHOD AND APPARATUS FOR MONITORING PACKET NETWORKS

BACKGROUND OF THE INVENTION

1. Field of the Invention

Embodiments of the present invention relate generally to a method and apparatus for monitoring packet networks and, more specifically, to a more precise way of time stamping packets that are used in measuring transit delay and transit delay variations between two points in a packet network

2. Description of the Related Art

Time and frequency alignment are essential to certain types of systems operating in a conventional communications network. For example, time alignment is required by instrumentation systems gathering data at specific time intervals or operating machinery according to specific timing. Frequency alignment is required in time-division multiplexing (TDM) and media streaming systems that require fixed video or audio sample rates across multiple clients. Typically, a system that is properly time-aligned is also frequency aligned. However, frequency alignment typically does not imply time alignment.

One approach known in the art that provides both time and frequency alignment involves computing an aligned time signal based on global positioning system (GPS) satellite timing signals, which are each held in precise alignment with a global clock reference. Using GPS signals to achieve time or frequency alignment is generally quite expensive and requires a client system to be able to receive satellite time signals from GPS satellites. In general, a more cost effective approach to time alignment is to transmit timing alignment information via a protocol that is operable within a given communications network.

In conventional TDM networks a physical layer methods implement frequency alignment throughout the network, starting with a designated master clock system. The designated master clock system delivers (frequency) timing information via bit-timing (or symbol-timing) information associated with downstream physical communication links. In normal operation each system coupled to the master clock system replicates the master clock timing information to downstream systems by replicating physical layer timing from the master clock system to each downstream system. Each system within the TDM network receives (frequency) timing information and aligns local (frequency) timing to an upstream clock reference, thereby enabling every system within the TDM network to achieve frequency alignment.

While frequency alignment within conventional TDM networks is relatively straightforward, packet-switched networks, such as networks based on the popular Ethernet industry standards, present time and frequency alignment challenges because packet-switched networks are not conventionally designed to provide precise delivery time for data or precise timing at any lower protocol levels. A key difference is that the switching and multiplexing functions are not as deterministic as circuit switching and TDM, but have a statistical aspect as well. The statistical nature of switching and multiplexing adds a different notion of quality of service. Whereas error performance is always important, the notions of delay variation and available bandwidth now come into play. For a given packet flow, such as for a circuit-emulated service, a certain minimum "bit rate" may be specified along with a measure of how much more bandwidth can be made available, depending on the level of network congestion. A Service Level Agreement (SLA) between the network provider and an end-user would specify, among other items, the guaranteed (minimum) bit rate (or equivalent) as well as the upper limit to packet delay variation and other factors that could be in jeopardy in situations of network congestion.

Furthermore, packet-switched networks typically involve multiple nodes that may store and forward data packets, potentially introducing significant transit delay variation between any two points. To generally overcome certain time alignment challenges inherent in packet-switched networks, certain time alignment protocols based on the industry standard internet protocol (IP) have been developed and deployed. One IP-based time alignment protocol is known in the art as the Network Time Protocol (NTP). NTP is used for aligning time between a master time reference and one or more clients. Precision Time Protocol (PTP) is a second IP-based time alignment protocol for aligning one or more client devices to a master time reference. PTP is defined in detail within the IEEE 1588® standard.

Lightly loaded packet-switched networks typically present relatively low transit delay variation, allowing IP-based alignment protocols such as NTP and PTP to easily achieve excellent accuracy relative to each protocol's specification. For example, in a lightly loaded gigabit Ethernet-based network, PTP can theoretically provide alignment of better than one hundred nanoseconds. However, conventional networks typically have a wide range of bandwidth loading conditions, which leads to large transit delay variations. Large transit delay variations can potentially cause client devices to fall out of alignment and fail. A network probe may be used to monitor network conditions with respect to a specified protocol, such as NTP or PTP, and to generate alerts when prevailing network conditions do not support proper operation of the specified protocol. With an appropriate alert, network operators can potentially take action to mitigate or avoid a failure. A network probe may also be used to generate traffic simulating a large population of time alignment client devices for the purpose of testing a given packet-switched network's ability to perform under load prior to operating the network with normal production traffic.

A conventional network probe comprises a computer system configured to communicate and interact with a time reference server and act as one or more client devices. In PTP, the time reference server is called a grandmaster. When a computer system configured to operate as a network probe interacts with a grandmaster, each incoming packet generates an interrupt within the computer system. An operating system controlling the computer system schedules an interrupt handler to process packets in response to the interrupt. When a PTP packet is received, the interrupt handler is typically configured to act as a PTP client device. The process of scheduling and executing an interrupt may take hundreds of microseconds on a typical computer system with relatively efficient interrupt handling. As a result, the potential measurement error associated with time-stamping an incoming PTP packet may be orders of magnitude larger than the resolution needed for the desired measurement. Time stamps for outbound packets will include similarly large errors. Furthermore, the computer system may not be able to accurately generate a useful volume of PTP traffic to properly simulate a set of client devices.

SUMMARY OF THE INVENTION

Embodiments of the present invention sets forth a more precise way to time stamp packets that are used in measuring transit delay and transit delay variations between two points in a packet network, and a packet probe that enables such precise time stamping. As a result, transit delay and transit delay variations between two points in a packet network can be measured more precisely. These measurements can then be used in carrying out a number of different network management functions. One such function is congestion monitoring. Certain metrics computed from the delay measurements provided using embodiments of the invention can describe the level of congestion in the network and armed with this knowledge suitable network management actions can be taken such as routing traffic around islands of congested segments. Another use is the development of routing algorithms with "cost of routing" based not on number of hops but on the ability of links to carry real-time traffic or traffic that is sensitive to transit delay variation such as services used for transport of timing. Examples of real-time traffic are VoIP (Voice over Internet Protocol), Video-over-IP, and IPTV (Internet Protocol Television); and examples of timing traffic are PTP and NTP.

A method of transmitting a packet onto a physical layer of a packet network, according to an embodiment of the present invention, includes the steps of generating a packet template having a plurality of data fields including a time stamp data field, updating the data fields of the packet template including the time stamp data field in hardware, the time stamp data field being updated last, and transmitting the packet template with all of the data fields updated as a completed packet. The time stamp data field is updated based on a start time of the step of transmitting and a time offset, wherein the time offset is an estimate of a delay between the start time of the step of transmitting and an actual time the completed packet is transmitted onto a physical layer of the packet network.

A method of processing a packet received from a physical layer of a packet network, according to an embodiment of the present invention, includes the steps of receiving packets through a media access control unit, and storing at least one received packet in memory with an associated time stamp, wherein the associated time stamp is generated in hardware and has a time value equal to a reference time at the time the received packet is stored in memory minus an estimate of a delay through the media access control unit. Prior to time stamping, the received packets may be filtered based on packet type. For some types of received packets, such as timing packets, a response packet may be automatically generated and transmitted to a sender of the received packet. A timing packet is generally defined as a packet that follows the structure rules associated with an IP protocol associated with packet-based timing methods such as PTP and NTP. Any packet that has a field for inserting a time stamp can be used as a timing packet.

A packet probe according to an embodiment of the present invention includes a transmit module coupled to a reference time source and configured to time stamp a transmit packet in hardware with a first time value, and a receive module coupled to the reference time source and configured to time stamp a receive packet in hardware with a second time value. The first time value is offset from a time indicated by the reference time source at the time the transmit packet is time stamped. The amount of this offset is representative of a delay through a transmit media access control unit by which the transmit packet is transmitted onto a physical layer of the packet network. The second time value is offset from a time indicated by the reference time source at the time the receive packet is time stamped. The amount of this offset is representative of a delay through a receive media access control unit by which the receive packet is received from the physical layer of the packet network.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Monitoring of packets and transit delay and transit delay variations between two points in a packet-switched network is achieved in the embodiments of the present invention described herein by deploying suitable gear, known as a network probe, at designated points in the network. The network probe may be provided as a stand-alone equipment or its monitoring functionality may be embedded into network elements.

Flow monitoring using network probes provides information regarding packet flows between selected points in the network. As a result, problem links and network elements can be identified, and corrective action such as suitable routing table modifications can be taken. The absolute delay and packet delay variation between pairs of network probes can be used to establish the health of network segments. Moreover, multiple streams between a pair of network probes, where each stream is assigned a different priority or class, known in the art as Quality of Service (QoS) class or Class of Service (Cos), are monitored to provide guidance as to the behavior of the packet network segment for each of the different classes.

Figure 1:
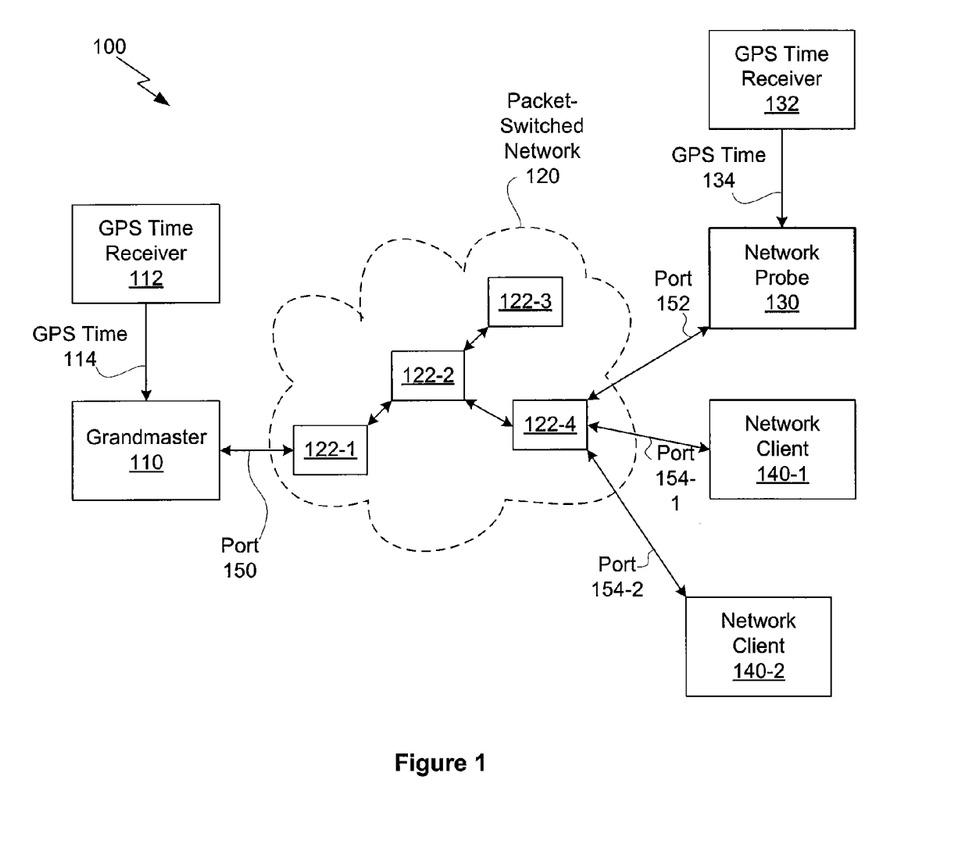
FIG. 1 illustrates a network system configured to implement one or more aspects of the present invention.

FIG. 1 illustrates a network system 100 configured to implement one or more aspects of the present invention. The network system 100 comprises a grandmaster 110 coupled to a global positioning system (GPS) time receiver 112 and to a packet-switched network 120, a network probe 130 coupled to a GPS time receiver 132 and to the packet-switched network 120, and network clients 140 coupled to the packet-switched network 120.

The packet-switched network 120 is configured to forward IP packets between two or more attached devices, based on a destination field within the IP packets. The packet network comprises network elements 122, which are configured to forward internet protocol (IP) packets based on an IP address, an Ethernet destination address, any other technically feasible forwarding information, or any combination thereof.

The GPS time receiver 112 computes a GPS time signal 114 based on time signals received from a plurality of GPS satellites. The grandmaster 110 receives the GPS time signal 114 and uses the GPS time signal 114 as a master clock when responding to time alignment protocol requests, such as PTP requests. The grandmaster 110 may be connected to the packet-switched network 120 via a physical port 150, which is provided by network element 122-1. The physical port 150 may comprise an Ethernet port, or any other technically feasible type of network port.

The GPS time receiver 132 computes GPS time signal 134 based on time signals received from a plurality of GPS satellites. During normal operation the GPS time signals 114 and 134 are precisely aligned in time (synchronized). The network probe 130 receives GPS time signal 134 for use as a local time reference when performing network performance measurements, as discussed in greater detail below.

The network probe 130 is connected to the packet-switched network 120 via physical port 152, which is provided by network element 122-4. By measuring network performance available through network element 122-4, the network probe 130 is generally able to determine network performance for other devices also attached to network element 122-4. For example, network clients 140-1 and 140-2 should experience network performance characteristics according to measurements taken by the network probe 130. Physical ports 152, 154-1, and 154-2 may comprise Ethernet ports, or any other technically feasible type of network port. In certain embodiments, physical ports 152, 154-1, and 154-2 should be substantially identical in design. For example physical ports 152, 154-1, and 154-2 may comprise gigabit Ethernet ports.

In this configuration, IP packets transmitted by the network probe 130 and destined for the grandmaster 110 traverse network elements 122-4, 122-2, and 122-1. Similarly, IP packets transmitted by the grandmaster 110 and destined for the network probe 130 traverse network elements 122-1, 122-2, and 122-4. Congestion within any network element 122-1, 122-2, 122-4 can impact delivery time of packets traversing between the grandmaster 110 and network probe 130. Such congestion may result from traffic arriving from unrelated sources, such as transit traffic from network element 122-3, which passes through network element 122-2 before final delivery.

With GPS time 134 available to network probe 130 and GPS time 114 available to grandmaster 110, network probe 130 can perform accurate transit delay measurements by acting as a PTP client of grandmaster 110. An accurate transit delay measurement can be used to characterize end-to-end network performance for the packet-switched network 120, and, more specifically, to characterize performance of the packet-switched network 120 with respect to end-to-end performance between network element 122-1 and network element 122-4. Accurately measuring end-to-end transit delay through the packet-switched network 120 is possible because the master clock 210 includes an accurate departure time stamp with outgoing packets, and the slave clock 212 is able to perform accurate arrival time measurements.

Figure 2:
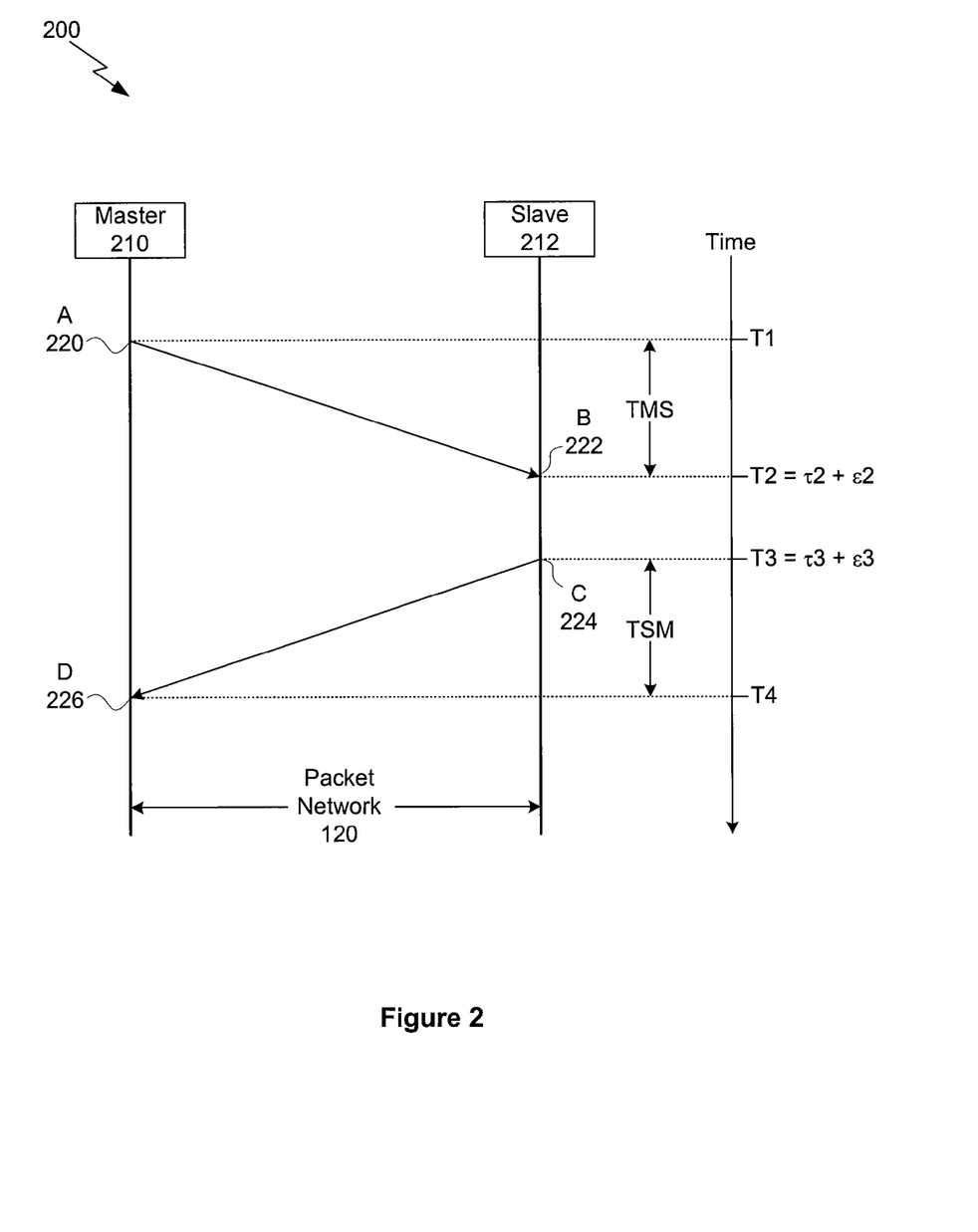
FIG. 2 illustrates a time protocol interaction between a master clock and a slave clock communicating via a packet network, according to one embodiment of the invention.

FIG. 2 illustrates a time protocol interaction between a master clock 210 and a slave clock 212 communicating via packet-switched network 120, according to one embodiment of the invention. The master clock 210 corresponds to grandmaster 110, while the slave clock 212 represents the network probe 130, network client 140, or any other technically feasible network client.

Event A 220 represents a departure of a first time stamped packet at actual departure time T1 from the master clock 210. A binary representation of the actual departure time T1 is included as the time stamp for the first time stamped packet. Event B 222 represents an arrival of the first time stamped packet at actual arrival time T2 at the slave clock 212. Actual arrival time T2 is equal to measured arrival time $\tau 2$ plus a measurement error $\epsilon 2$. With GPS time signal 134 providing a highly accurate local time reference with which to measure arrival time, measurement error $\epsilon 2$ can be very small (essentially zero) in practice and the measured arrival time $\tau 2$ can accurately represent the actual arrival time T2.

Event C 224 represents a departure of a second time stamped packet at actual departure time T3 from the slave clock 212. A binary representation of actual departure time T3 is included as the time stamp for the second time stamped packet. Actual departure time T3 is equal to measured departure time $\tau 3$ plus a measurement error $\epsilon 3$. As with measuring T2, the GPS time signal 134 provides a highly accurate local time reference, driving measurement error $\epsilon 3$ to essentially zero. Event D 226 represents an arrival of the second time stamped packet at actual arrival time T4 by the master clock 210.

The first time stamped packet traverses the packet-switched network 120 in master-slave transit delay time TMS. The second time stamped packet traverses the packet-switched network 120 in slave-master transit delay time TSM. Transit delay times TMS and TSM are representative of transit delay within packet-switched network 120 between network elements 122-1 and 122-4. Persons skilled in the art will recognize that transit delay times TMS and TSM may also be used to characterize other aspects of packet-switched network 120, such as loading or congestion.

Figure 3:
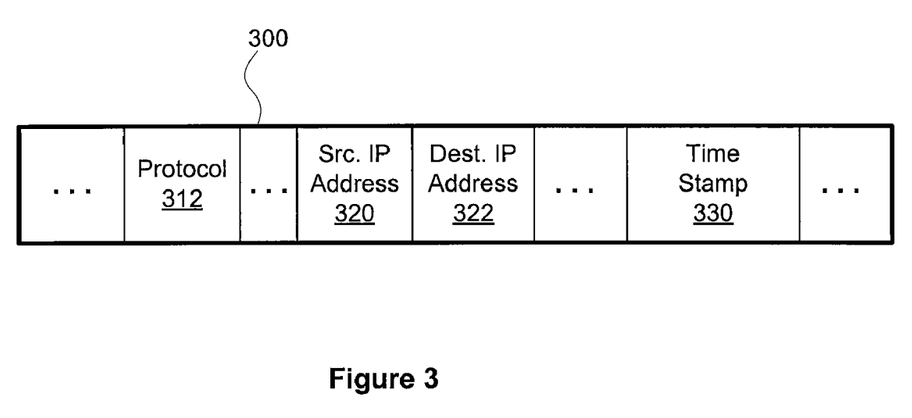
FIG. 3 illustrates a time protocol IP packet used to communicate between the master clock and the slave clock within the packet network, according to one embodiment of the invention.

FIG. 3 illustrates a time protocol IP packet 300 used to communicate between the master clock 210 and the slave clock 212 within the packet-switched network 120, according to one embodiment of the invention. As shown, the time protocol IP packet 300 comprises standard IP fields, such a protocol field 312, a source IP address field 320, a destination IP address field 322, and a time stamp field 330. The protocol field 312 identifies how a recipient device should interpret the packet 300 with respect to a specific protocol. For example, the protocol field 312 may identify the packet 300 as a PTP packet, thereby uniquely defining other fields within the packet 300, such as a time stamp field 330, used to indicate a departure time for the packet. A source IP address field 320 identifies an IP address for the system that sent the packet 300, while a destination IP address 322 identifies an IP address to which the packet 300 should be delivered by packet-switched network 120.

Figure 4:
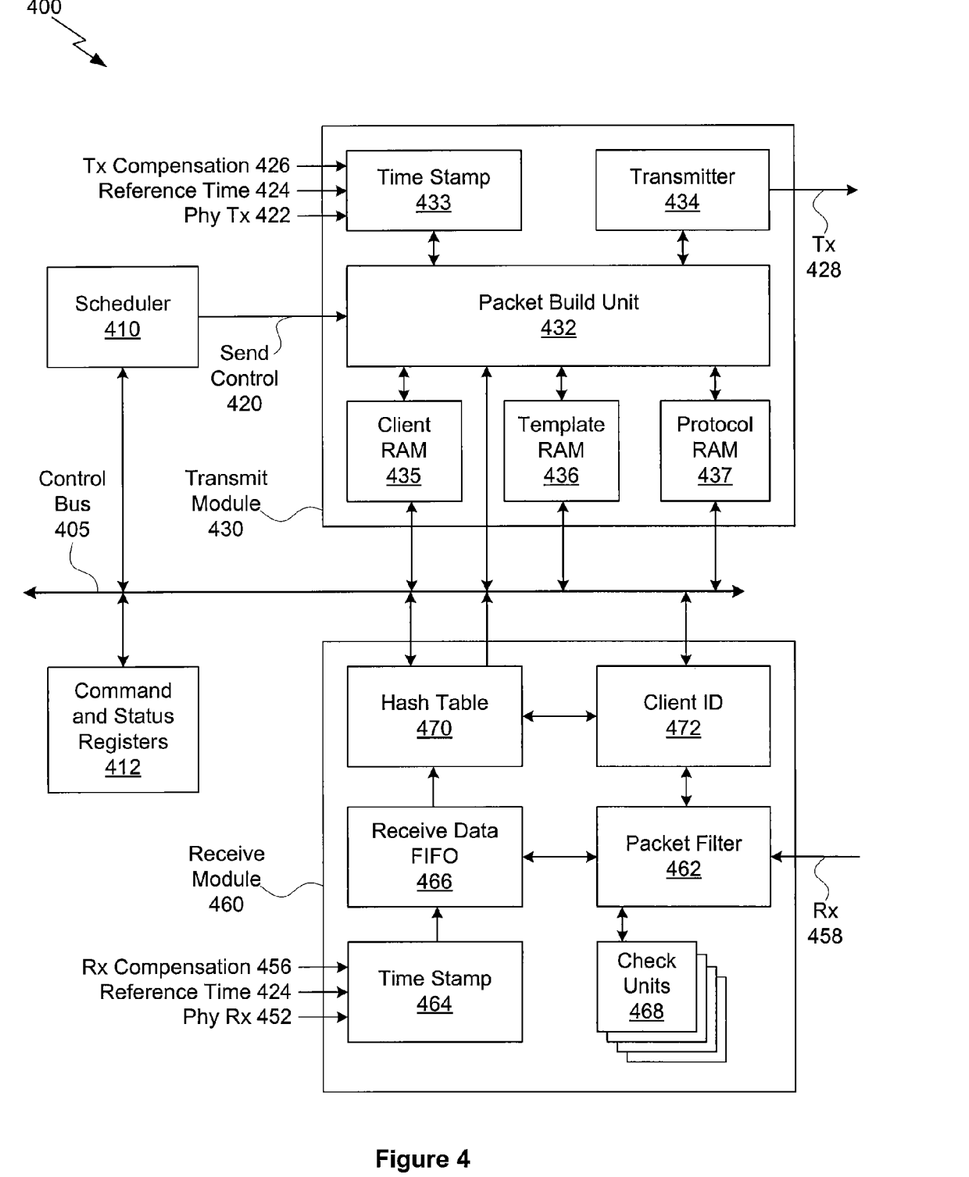
FIG. 4 illustrates a packet probe engine within the network probe, according to one embodiment of the invention.

FIG. 4 illustrates a packet probe engine (PPE) 400 within the network probe 130, according to one embodiment of the invention. The PPE 400 comprises a transmit module 430, a receive module 460, a scheduler module 410, and a command and status registers module 412. The transmit module 430, receive module 460, scheduler module 410, and command and status registers module 412 are coupled to a control bus

405, configured to allow a host processor (not shown) to communicate with each respective module.

The PPE 400 generates a transmit data signal (Tx) 428 and a receive data signal (Rx) 458 based on a reference time signal 424, a physical transmission start signal (Phy Tx) 422, a transmit latency compensation signal (Tx Compensation) 426, a physical reception start signal (Phy Rx) 452, and a receive latency compensation signal (Rx Compensation) 456. The reference time signal 424 is a globally accurate and aligned time signal derived from the GPS time signal 134 of FIG. 1.

Figure 5A:
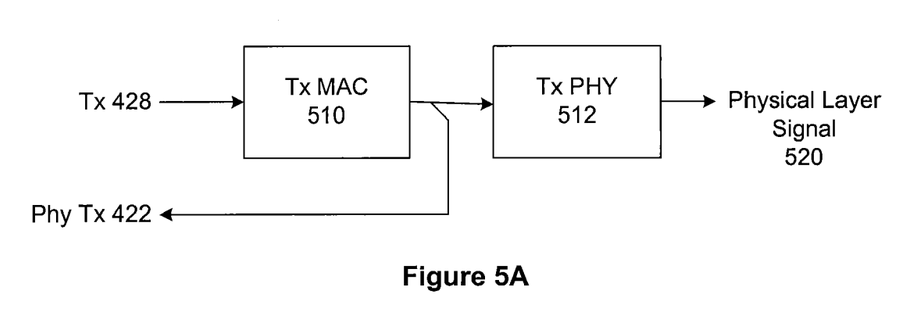
FIG. 5A illustrates an Ethernet physical layer transmitter unit configured to generate a physical layer signal that represents Ethernet frame data.

The transmit latency compensation signal 426 is a constant transmit latency value characterizing a delay through a transmitter media access control unit (shown in FIG. 5A). Tx 428 passes through this transmitter media access control unit before it is transmitted onto the physical layer. Phy Tx 422 is asserted at a transmission time offset relative to an actual start of transmission by the physical layer transmitter unit. The transmission time offset is characterized by the transmit latency compensation signal 426. The transmit latency compensation signal 426 may also include processing latency associated with the transmit module 430.

Figure 5B:
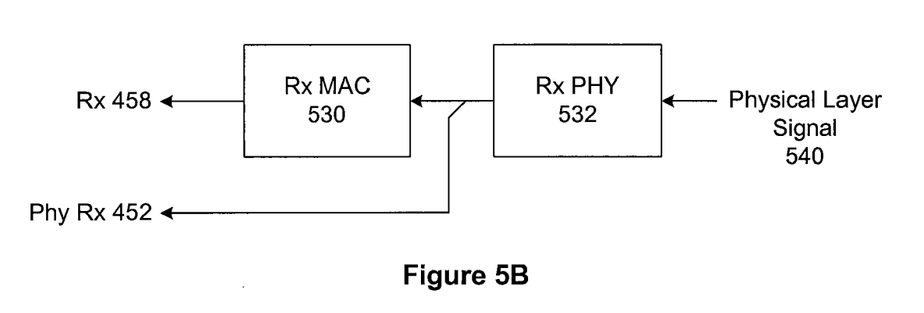
FIG. 5B illustrates an Ethernet physical layer receiver unit configured to receive and decode a physical layer signal.

The receive latency compensation signal 456 is a constant value characterizing a delay of Rx 458 through a receiver media access control unit (shown in FIG. 5B). Rx 458 is received at the receive module 460 from the physical layer by way of this receiver media access control unit. Phy Rx 452 is asserted at a receive time offset relative to an actual start of reception by the physical layer receiver unit. The receive time offset is characterized by the receive latency compensation signal 456. The receive latency compensation signal 456 may also include processing latency associated with the receive module 460.

The transmit latency compensation signal 426 and the receive latency compensation signal 456 may be determined from prior measurements of the delay through the transmitter media access control unit and the receiver media access control unit, respectively. In some embodiments, the delay from a prior packet may be sampled and applied as the time offset for a current packet.

The transmit module 430 is configured to generate an IP packet and transmit the IP packet as an Ethernet frame via Tx 428 in response to a generate command sent via send control 420 requesting that the transmit module 430 generate and transmit the IP packet. The transmit module 430 comprises a packet build unit 432, a client random access memory (RAM) 435, a packet template RAM 436, a protocol RAM 437, a time stamp unit 433, and a transmitter unit 434. In one embodiment, the packet build unit 432 is implemented as a field programmable gate array (FPGA) and the time stamp unit 433 is implemented as an FPGA. In alternative embodiments, the packet build unit 432 and the time stamp unit 433 may be implemented as other types of hardware devices including application specific integrated circuits.

The packet build unit 432 performs a set of operations to build a complete protocol packet and prepare the packet for transmission via the transmitter 434. Packets are built based on a template system, where a major portion of a given packet payload is defined in a static template. When a given packet is built, updates are applied to data fields within the template to generate a complete and correct packet. In one embodiment, there are two types of packet updates: stream-based updates and protocol-based updates. For stream-based updates, an identifier for each updated field and data associated with each updated field are specified by software executing on the host processor on a stream-by-stream basis. For protocol-based updates, an identifier for each updated field and data associated with each updated field are specified for each particular type of message. For protocol-based updates, each update is applied to all packets of a given type. Updates may also include client or session related information, such as client IP address, VLAN address, and packet sequence number. During the packet build process, the PPE is responsible for calculating and updating any required checksums. In one embodiment, the packet build unit 432 performs checksum computations for packets built by the PPE 400.

Data field updates can be applied on a per packet-stream (session) basis when a packet is being built. The packet-stream update mechanism for generating packets should update one or more fields in a packet that vary on a per stream basis. One example of a data field that needs to be updated on a per packet-stream basis is the destination MAC address in an Ethernet header. Similarly, the destination IP address in an IP header of a packet needs to be updated to reflect a client (destination) IP address for a packet being generated. The packet-stream update mechanism can be used to update any field in the packet. For efficient memory usage, certain update information may be shared over multiple streams, whereas data pertaining to a specific stream should include one instance of the stream-specific data.

The client RAM 435 is configured to store client related information, such as client IP address, VLAN address, and sequence number. The template RAM 436 is configured to store a definition of a basic packet structure to be generated and includes data fields that are populated with specific client and protocol information during packet generation. The protocol RAM 437 is configured to store information related to a protocol structure, such as where specific data fields are placed within a generated packet. In one embodiment, client RAM 435, template RAM 436, and protocol RAM 437 are implemented as FPGA memory block RAMs.

In the embodiment of the present invention described herein, the template RAM 436 and protocol RAM 437 are organized as two pages, and one of the two pages may be designated as active, making the other page inactive. The active page is used by the PPE 400 to perform packet generation processes. The inactive page may be accessed by the host processor to configure a new template. The inactive page may be designated the active page by the host processor at any time, however, the new designation will only take place at a safe time, such as when the packet build unit 432 is idle.

The time stamp unit 433 receives reference time 424 and the transmit latency compensation signal 426 and generates a compensated transmit time stamp, which is transmitted to the packet build unit 432. The compensated transmit time stamp is generated by adding the reference time 424 to the transmit latency compensation signal 426. The compensated transmit time stamp is the last update performed during packet generation.

The transmitter unit 434 receives packet information from the packet build unit 432 and transmits the packet information as Tx 428, which is supplied to an Ethernet media access control (MAC) unit, shown in FIG. 5A. The transmitter unit 434 is configured to perform any data and transfer rate translation necessary to generate Tx 428.

The receive module 460 is configured to receive an IP packet encoded as an Ethernet frame via Rx 458 and filter the IP packet according to a set of acceptance rules. If an IP packet passes the acceptance rules, then certain data from the IP packet is made available to the control bus 405.

The receive module 460 comprises a packet filter 462, a time stamp unit 464, a receive data first-in first-out (FIFO) buffer 466, check units 468, a hash table unit 470, and a client identification (ID) unit 472. The receive module 460 is configured to receive an incoming packet via Rx 458 and to process the packet according to programmable settings. In an alternative embodiment, the receive data FIFO 466 may be configured as a dual-port RAM. Also, the time stamp unit 464 is implemented in one embodiment as an FPGA. In alternative embodiments, the time stamp unit 464 may be implemented as other types of hardware devices including application specific integrated circuits.

The packet filter 462 is configured to identify incoming packets that match one of a plurality of programmable patterns. For packets that match one of the plurality of programmable patterns, the receive module 460 responds according to a programmable set of rules. One programmable response is to forward the packet to software executing on the host processor. Another response is to drop (discard) the packet. Yet another response is to generate an automatic reply to a respective client via the transmit module 430. The packet filter 462 is coupled to a set of check units 468 that are each configured to recognize a particular packet type using a set of programmable rule sets. The check units 468 and any associated rule sets may each be configured by software executing on the host processor. Any technically feasible technique may be used by the check units 468 to recognize packets.

When a packet is recognized as a packet that should be handled by the PPE 400, certain data fields within the packet are extracted and pushed into the receive data FIFO 466, along with a corresponding compensated receive time stamp. The receive data FIFO 466 stores the extracted packet data and presents the extracted packet data to a hash table unit 470, which is configured to identify long patterns and generate shorter index values using any technically feasible techniques. Persons skilled in the art will recognize that hashing techniques may be used to generate a relatively short index value from a longer data string. For example, an IPv4 address may comprise a data string of thirty-two bits of address information that may be hashed into a twelve-bit index value that concisely identifies one of up to 2048 different client devices (via their IP address) communicating with the PPE 400. Similarly, an IPv6 address may comprise a data string of 128 address bits that may be hashed to an arbitrary length index value. In one embodiment, the hash table unit 470 hashes an IPv4 IP address and related session information into a twelve bit value to identify up to 2048 different sessions from up to 2048 different IP addresses.

The time stamp unit 464 receives reference time 424 and the receive latency compensation signal 456 and generates the compensated receive time stamp, which is transmitted to the receive data FIFO 466. The compensated receive time stamp is generated by adding the reference time 424 to the receive latency compensation signal 456. The compensated receive time stamp is pushed into the receive data FIFO 466 along with related packet information for packets that are identified by the packet filter 462 as needing to be processed by the PPE 400.

The client identification unit (ID) 472 receives an index value corresponding to a packet that was identified by the packet filter 462 for processing by the PPE. The client ID 472 uses the index value to retrieve certain client and session state information used to generate a response. For example, the index value may be used to retrieve a packet sequence number, a protocol type, and so forth, which are necessary to properly respond. In one embodiment, the receive module 460 requests that the scheduler module 410 generate a response when appropriate within the context of a particular protocol. The request may be generated via the host processor or directly from the receive module 460 interacting with the scheduler module 410.

The scheduler module 410 is configured to trigger packet generation by the transmit module 430 according to a programmable set of rules. The scheduler module 410 triggers the transmit module 430 to generate and transmit packets at programmed rates to specific streams in timing applications and to deliver probe packets at designated intervals for probe applications. The scheduler module 410 uses the notion of events for purposes of scheduling, an event being the delivery of a packet for a particular stream. The number of scheduled events that can be supported is a function of hardware complexity. Supporting up to 2048 scheduled events is quite straightforward with current technological constraints. Each scheduled event is defined by data stored in an event entry within a control memory, disposed within the PPE 400. In one embodiment, the control memory resides within the scheduler module 410. In an alternative embodiment, the control memory resides within the command and status registers module 412.

The intervals of transmission are programmable. In keeping with most applications that may require this feature, a typical design will support intervals of transmission based on powers of two with a range of values between $2^{-10}$ to $2^7$ seconds, or $\frac{1}{1024}$ to 128 seconds.

Each event has a programmable interval. Also, each event is programmed with pointers to information stored within the PPE 400 regarding the packet content and the type of packet to send. The packet build unit 432 builds and transmits the packet when it is scheduled. Packet generation and transmission may also be scheduled according to a dithering process. When enabled, dithering will vary the transmit intervals of all active streams (packets associated with a given IP session), except a certain stream programmed in a specified entry (e.g., event entry 2048 of 2048 possible entries) of the control memory. A transmit window of approximately 800 microseconds may be used for scheduling dithered transmission of packets within a 976 microsecond (1024 Hz) scheduling interval. Although the time between successive transmissions of a specific stream will be varied, the average rate will be executed within each scheduling interval exactly as programmed. Extensions of the dithering process allow the launching of packets in a burst mode and in modes that have multiple packet transmissions, unequally spaced in time, but following an overall periodic behavior. This transmission pattern is often called "N packets in M seconds" and is useful to excite certain modes of behavior in packet networks.

The command and status registers module 412 are configured to store certain configuration information for controlling the operation of the PPE 400 and modules therein. For example, the configuration information for the schedule module 410 may be stored within the command and status registers module 412. Additionally, a selection bit can be stored within the command and status registers module 412 for controlling which pages of memory within the template RAM 436 and protocol RAM 437 are active.

FIG. 5A illustrates an Ethernet physical layer transmitter unit (Tx PHY) 512 configured to generate a physical layer signal 520 that represents Ethernet frame data Tx 428. A transmitter media access control unit (Tx MAC) 510 processes Tx 428 and sends processed Tx 428 data to Tx PHY 512 for transmission via physical layer signal 520. The Tx MAC 510 manages transmission of the Ethernet frames via the Tx PHY 512. The physical layer signal 520 represents Ethernet frames as sequential bit patterns in either an electrical or optical media.

A preamble pattern marks the start of each transmitted Ethernet frame. At the start of the preamble pattern, Phy Tx 422 is asserted, alerting the time stamp unit 433 of FIG. 4 that an outbound Ethernet frame is departing. The latency from when a frame actually starts to when Phy Tx 422 is asserted may be large compared to a measured time resolution; however latency should be consistent within the Tx PHY 512. In one embodiment, Phy Tx 422 is sampled by the time stamp unit 464 of FIG. 4 with a time resolution of 4 nanoseconds. In an alternative embodiment, Phys Tx 422 is sampled by the time stamp unit 464 with a time resolution of 8 nanoseconds.

FIG. 5B illustrates an Ethernet physical layer receiver unit (Rx PHY) 532 configured to receive and decode a physical layer signal 540, according to one embodiment of the invention. The Rx PHY 532 transmits the decoded physical layer signal to a receiver media access control unit (Rx MAC) 530 for processing. The physical layer signal 540 represents Ethernet frames as sequential bit patterns in either an electrical or optical media.

The beginning of each Ethernet frame is marked by a preamble pattern. When the preamble pattern arrives at the Rx PHY 532, Phy Rx 452 is asserted, alerting the time stamp unit 464 that an Ethernet frame is arriving. In one embodiment, Phy Rx 458 is sampled by the time stamp unit 464 of FIG. 4 with a time resolution of 4 nanoseconds. In an alternative embodiment, Phys Rx 458 is sampled by the time stamp unit 464 with a time resolution of 8 nanoseconds.

In the embodiments of the present invention described above, grandmaster 110 may be any PTP time reference server. In one embodiment, the grandmaster 110 is a network probe that includes PPE 400 and is configured to operate as a PTP time reference server.

While embodiments of the present invention are described in terms of Ethernet technologies, persons skilled in the art will recognize that this invention may be implemented using any technically feasible physical link layer technology without departing the scope of this invention.

In sum, a technique for accurately probing a network to measure end-to-end transit delay is disclosed. A network probe incorporates hardware-based time stamping of transmitted packets using a physical transmission start signal (Phy Tx 422) and a physical data layer latency compensation figure to accurately time stamp a transmitted IP packet based on an actual start time for transmitting the packet. Each transmitted IP packet may be scheduled for transmission using a hardware scheduler that is configured trigger the packet build control 432 to construct and transmit a packet. The network probe also incorporates hardware-based time stamping of received packets using a physical reception start signal (Phy Rx 452) and a physical data layer latency compensation figure to accurately time stamp a received IP packet based on an actual arrival time for the packet.

One advantage of the disclosed system is that greater accuracy can be achieved through compensated hardware-based time stamping for both received and transmitted IP packets. An additional advantage of the disclosed system is that transmitted packets may be generated to achieve high packet rates, according to precise timing and generation characteristics.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

We claim:

1. A method of transmitting a packet onto a physical layer of a packet network, comprising the steps of:
    generating a packet template having a plurality of data fields including a time stamp data field;
    updating the data fields of the packet template including the time stamp data field in hardware, the time stamp data field being updated last; and
    transmitting the packet template with all of the data fields updated as a completed packet,
    wherein the time stamp data field is updated based on a start time of the step of transmitting and a time offset, and
    wherein the time offset is an estimate of a delay between the start time of the step of transmitting and an actual time the completed packet is transmitted onto a physical layer of the packet network.

2. The method according to claim 1, wherein the completed packet is transmitted to a media access control unit for subsequent transmission onto a physical layer of the packet network and the time stamp data field is updated based on a start time of the step of transmitting and an estimated delay through the media access control unit.

3. The method according to claim 1, further comprising the steps of scheduling packets for transmission at a programmed interval and transmitting the packets one at a time at the programmed interval, wherein successively transmitted packets have time stamps that differ from each other by the programmed interval.

4. The method according to claim 1, further comprising the steps of scheduling packets for transmission at a programmed interval and transmitting the packets one at a time at the programmed interval unless a packet is already in transmission, in which case, delaying the transmission of the subsequent packets, wherein the time stamp data field of a delayed packet is not updated until the delayed packet is ready for transmission.

5. The method according to claim 1, further comprising the steps of scheduling packets for burst mode transmission according to which packets are transmitted at uneven time intervals that have a repeating pattern.

6. A method of processing a packet received from a physical layer of a packet network, comprising the steps of:
    receiving packets through a media access control unit; and
    storing at least one received packet in memory with an associated time stamp, wherein the associated time stamp is generated in hardware and has a time value equal to a reference time at the time the received packet is stored in memory minus an estimate of a delay through the media access control unit.

7. The method according to claim 6, further comprising the step of filtering the received packets based on packet type.

8. The method according to claim 7, wherein the step of filtering includes:
    examining a data field of a received packet; and
    determining if a bit pattern in said data field matches a predetermined bit pattern.

9. The method according to claim 7, wherein the received packets that are filtered are discarded.

10. The method according to claim 7, wherein the received packets that are not filtered are stored in memory with an associated time stamp.

11. A packet probe comprising:

a transmit module coupled to a reference time source and configured to time stamp a transmit packet in hardware with a first time value that is offset from a time indicated by the reference time source at the time the transmit packet is transmitted to a transmit media access control unit for subsequent transmission onto a physical layer of a packet network; and a receive module coupled to the reference time source and configured to time stamp a receive packet in hardware with a second time value that is offset from a time indicated by the reference time source at the time the receive packet is received from the physical layer of the packet network through a receive media access control unit.

12. The packet probe according to claim 11, wherein the amount of offset in the first time value is representative of a delay through the transmit media access control unit.

13. The packet probe according to claim 11, wherein the amount of offset in the second time value is representative of a delay through the receive media access control unit.

* * * * *